United States Patent [19]

Nichols

[11] 4,033,119
[45] July 5, 1977

[54] DUAL CYCLE AIRCRAFT TURBINE ENGINE

[75] Inventor: Mark R. Nichols, Newport News, Va.

[73] Assignee: The United States of America as represented by the Administrator of the National Aeronautics and Space Administration, Washington, D.C.

[22] Filed: Sept. 6, 1973

[21] Appl. No.: 394,898

[52] U.S. Cl. .............................. 60/226 R; 60/263; 415/145
[51] Int. Cl.² .......................................... F02K 3/06
[58] Field of Search ............................ 60/224–226, 60/229, 244, 263; 415/145

[56] References Cited

UNITED STATES PATENTS

| | | | |
|---|---|---|---|
| 2,823,516 | 2/1958 | Schelp | 60/224 |
| 3,149,461 | 9/1964 | Eichholtz | 60/225 |
| 3,769,797 | 11/1973 | Stevens | 60/226 R |

FOREIGN PATENTS OR APPLICATIONS

| | | | |
|---|---|---|---|
| 79,218 | 11/1949 | Czechoslovakia | 60/224 |
| 881,967 | 11/1961 | United Kingdom | 60/224 |

*Primary Examiner*—Carlton R. Croyle
*Assistant Examiner*—Robert E. Garrett
*Attorney, Agent, or Firm*—Howard J. Osborn; John R. Manning

[57] ABSTRACT

A method and apparatus applicable to jet engines for improving operating efficiency over broad ranges of flight conditions and for reducing engine noise output in take-off and landing by controlling the airflow entering and exiting the engines. A turbojet engine apparatus is described which operates efficiently at both subsonic and supersonic speeds and a method is described which enables a turbofan with an associated satellite turbojet or turbofan to operate more efficiently at both subsonic and supersonic speeds. In both cases, take-off and landing noise is reduced substantially. The apparatus consists essentially of arranging for two separate portions of an engine to act upon one airstream or, alternately, to operate on independent airstreams.

6 Claims, 7 Drawing Figures

DUAL CYCLE AIRCRAFT TURBINE ENGINE

ORIGIN OF THE INVENTION

The invention described herein was made by an employee of the United States Government and may be manufactured and used by or for the Government for governmental purposes without the payment of any royalties thereon or therefor. .

BACKGROUND OF THE INVENTION

It is well established that the benefits of various turbine engines vary with the speed range in which they operate. While the turbojet engine is generally more satisfactory for transonic and supersonic speeds, the high-bypass-ratio turbofan engine is more desirable for subsonic flight speeds because of its higher efficiency at such speeds and its lower noise level in the vicinity of the airport.

The wide interest in a commercially operable supersonic transport aircraft (SST) has pointed out the need for meeting the combined criteria of low airport noise level and high operating efficiency in both subsonic and supersonic flight. Various proposals have been made for dual-cycle propulsion systems which combine the features of the turbojet and turbofan engine concepts. One possible approach is the use of two virtually independent sets of engines with each set operating primarily only during the portion of the flight when its characteristics are most desirable. In this method one set of engines is substantially unused at all times and as a result the total propulsion installation suffers a severe penalty in weight and bulk. A second approach is the use of a moderate to high bypass ratio turbofan with internal variable geometry features that permit a substantial reduction in bypass ratio for high-speed operation. The disadvantages of this second approach are that the engine cycle cannot provide supersonic cruise efficiency as high as that for a pure turbojet and, at the same time, the supersonic drag of the installation is increased because the air inlet must be sized for low speed operation. The present invention solves the weight, bulk, and performance problems of the two approaches just discussed through an air interchange concept which accomplishes a complete conversion from a turbojet to a turbofan cycle with all components of the engine utilized at all times, and permits the supersonic air inlet to be sized for the supersonic case only.

SUMMARY OF THE INVENTION

The present invention is a method and apparatus applicable to jet engines for improving operating efficiency over broad ranges of flight conditions and for reducing engine noise output in take-off and landing. It incorporates variable configuration concepts which effectively vary the engine cycle from that of a turbojet for operation at high subsonic, transonic and supersonic speeds to that of a low bypass ratio turbofan for operation in the vicinity of the airport and at low flight speeds.

One embodiment of the present invention is basically a twin-spool turbojet with separated front and rear compression units. The two separate compressor units are connected by transition ductwork designed in such a manner that each compressor may be operated either in conjunction with the other unit so that the two together form an efficient turbojet or as an independent unit in the turbofan operating mode. The turbines driving these separated compressors have variable geometry turbine stators which are actuated to provide the differing work outputs required in the two modes of engine operation. In addition, variable geometry primary and secondary nozzles are provided downstream of the turbines to control and optimize the efficiency of the gas flow through the engine core.

The ductwork between the front and rear compressor in this embodiment of the invention consists of fixed ducting which forms the air exit flow path from the front compressor and a rotating transition drum also containing ducting. In one setting the ducting in the transition drum is positioned to feed the exit flow of the front compressor directly into the rear compressor for conventional turbojet operation. In the other arrangement which closely simulates turbofan operation the ducting is positioned so that the front compressor air is diverted to the external stream and independent air flow enters the rear compressor. Thus, the transition drum changes the compressors from series action upon the same airstream to parallel action with independent air flow. In the latter case the air stream exciting from the front compressor is deflected away from the airstream being fed into the rear compressor to prevent interaction.

Operation of each compressor is accomplished from the power generated by its associated turbine. The front compressor is driven by a shaft which follows the centerline of the engine and around which the indexing drum rotates. The rear compressor, its associated turbine, and its drive shaft are constructed coaxial to the front compressor shaft. Another embodiment of the invention consists of a similarly versatile arrangement of one leading turbofan engine furnishing the air for a following turbojet or turbofan. In this apparatus the hot exhaust flow from the front turbofan is exited through a dedicated exit at the side or rear of the nacelle and the use of flap-type doors permits the option of either furnishing the turbofan fan airflow to the following engine or opening the flap doors so that each engine operates on an independent airstream. Thus, the versatility of this concept is further enhanced by the fact that the leading engine can be either a low pressure turbojet compressor or a complete turbofan engine. In either case, the option of units operating on the same airstream or on independent ones gives the configuration improved characteristics over any existing single cycle system and any system with two non-interacting engines of different characteristics.

DETAILED DESCRIPTION OF THE INVENTION

Figure 1:
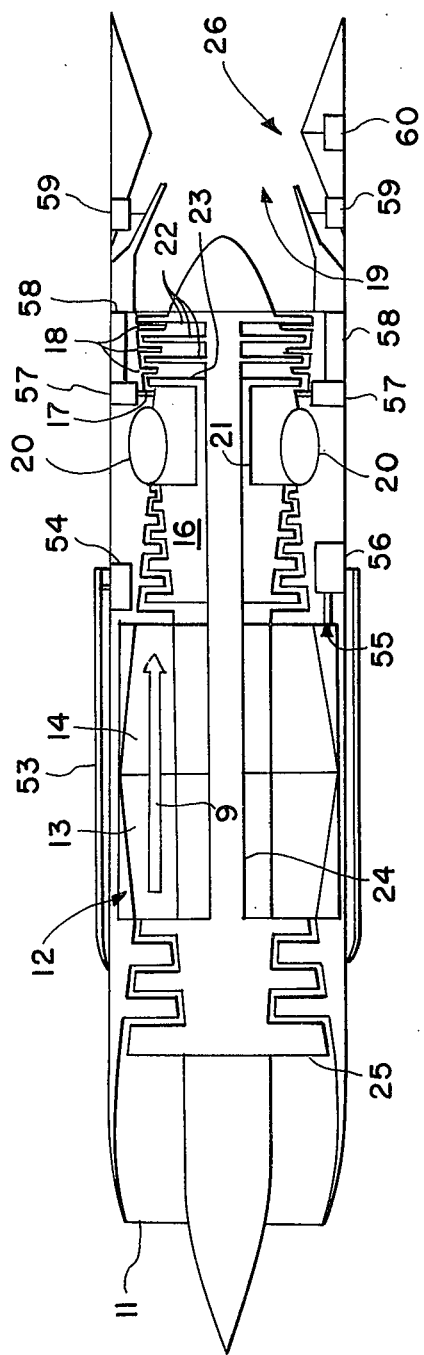
FIG. 1 is a cross sectional view of the preferred embodiment of the invention.
Figure 3:
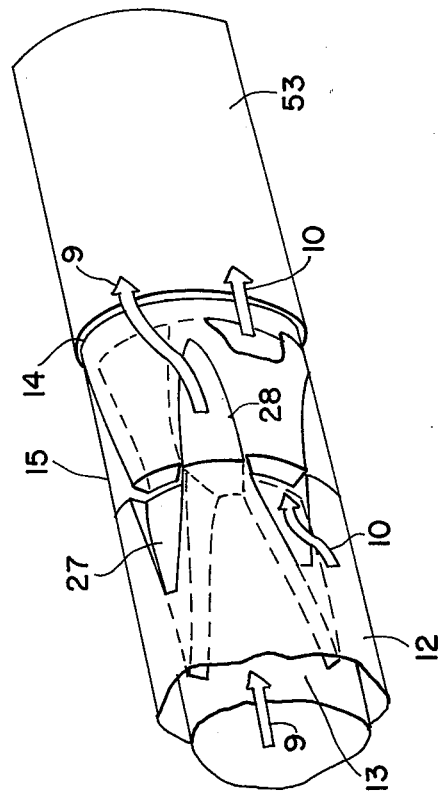
FIG. 3 is a perspective view of the transition ducting of FIG. 1 in position for the turbofan mode of engine operation.
Figure 2:
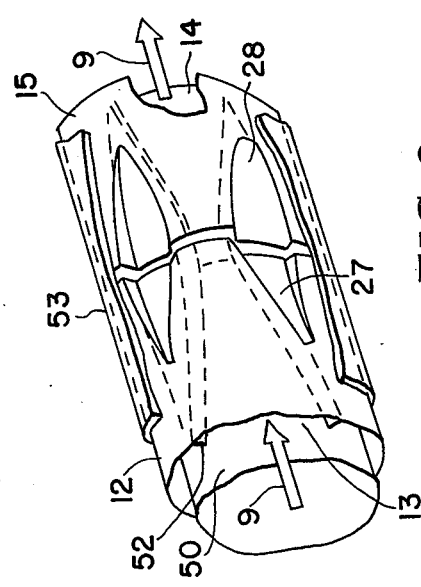
FIG. 2 is a perspective view of the transition ducting of FIG. 1 in position for the turbojet mode of engine operation.

The preferred embodiment of the invention selected for illustration is shown in FIGS. 1, 2, and 3. FIG. 1 shows a cross sectional view of a twin-spool turbojet with sufficient longitudinal separation of the front and rear compressor units to permit the insertion of transition ducting between them. FIG. 1 shows the engine arranged for the turbojet mode of operation. In such a configuration the total internal airflow enters the primary inlet 11, has its pressure increased successively by the front compressor 25 and rear compressor 16, and then enters the combustion chamber 20 where fuel is continuously injected and burned.

High pressure hot gases from combustion chamber 20 pass through the high pressure turbine stator 17 where they are directed at the high pressure turbine rotor 23. The angle at which the gases approach rotor 23 may be changed to adjust the work output of the turbine by use of the variable geometry means 57 of stator 17 which changes the angle of orientation of the stator blades. Rotor 23, turning because of the energy of the hot gases impinging on its blades drives the rear compressor 16 through shaft 21.

As the gases leave the high pressure turbine rotor 23 they enter the first of a series of low pressure stators 18. These stators, like the high pressure stator 17, have blades whose angle of deflection may be changed by variable geometry means 58 to permit adjustment of power output and maximization of efficiency depending upon the condition under which the engine is operating. Each low pressure stator 18 directs the gases onto its associated rotor 22 from which the next low pressure stator receives the gases until each of the rotors has removed an appropriate amount of energy from the gas. The low pressure rotors 22 drive the front compressor 25 by means of shaft 24 which follows the centerline of the engine. The two compressor shafts are constructed coaxially so that shaft 21 of the rear compressor operates independently of shaft 24 of the front compressor.

As the hot gas leaves the last turbine rotor, it is still at a high temperature and at a pressure considerably above atmosphere. It therefore has residual total energy and may still perform work. The gas is discharged through the primary exhaust nozzle 19, which controls the quantity of engine airflow, and then through the secondary nozzle 26, which accelerates the existing flow to high velocity to furnish forward thrust. The efficiency of this exhaust action is maximized for the particular mode of engine operation by the orientations of the primary nozzle 19 and the secondary nozzle 26 provided by nozzle actuators 59 and 60 which give them the variable geometry feature.

In the alternate or turbofan mode of operation, the internal engine flow processes and operating considerations are identical to those just described except that adjustment of the position of the indexing transition drum 14, as illustrated in FIGS. 2 and 3, carries the air flow 9 from the front compressor 25 to be diverted overboard (FIG. 3) and replaced by a fresh flow of air 10 from the external stream to the rear compressor 16. This change increases the total airflow acted on by the two compressors by a factor between about 1½ and 2. The two compressors continue to be driven by the same turbines as in the turbojet mode. However, adjustment to the variable turbine stators 17 and 18 and to the settings of the primary and secondary nozzles 19 and 26 are required to re-optimize overall engine operating conditions.

This preferred embodiment is dependent on the design of the transition ducting which consists of fixed transition section 12 and indexing transition drum 15. From FIGS. 1 and 2, it can be seen that fixed transition section 12 consists of an annular air passage 50 just behind the front compressor. The annular air passage 50 is divided into a number of equal area stationary ducts 13 (four in the case illustrated) by wedge-shaped island 52 which widen as they progress downstream until at the end of transition section 12 the annular air passage is divided into equal ducts which occupy only one-half of the circumference of transition section 12. Each duct 13 increases in height as it progresses rearward so that the actual air flow cross section remains nearly constant from one end of the passage to the other. At the rear of transition section 12 the other half of the annular circumference is occupied by the same number of equally spaced inlet ramps 27 (four in the case illustrated). As shown in FIG. 2, these ramps 27 along with similar indentations 28 on transition drum 15 are oriented so that they are adjacent to each other when the transition ducting is in position for the turbojet mode of engine operation. During this mode of operation cover 53 is positioned to cover inlet ramps 27 and indentations 28 and maintain the aerodynamic surface of the engine configuration.

Transition drum 15 is essentially a mirror image of fixed transition section 12. Drum 15, however, is rotatable so that movable ducts 14 can either by alined with stationary ducts 13 as shown in FIGS. 1 and 2 for the turbojet mode of operation or alined with inlet ramps 27 as shown in FIG. 3 for the turbofan mode of engine operation.

For high-speed turbojet operation, the air 9 after being compressed by the front compressor 25 enters stationary duct 13 within fixed transition section 12 and with the position of transition drum 15 as shown in FIGS. 1 and 2 the airstream is directed into movable duct 14 from which it is channeled into the rear compressor 16. Thus, rear compressor 16 further compresses the flow 9 prior to its entry into the combustion chamber 20.

For the turbofan mode of operation, transition drum 15 is rotated by an angle of 360° divided by the number of flow passages by indexing actuator 56 acting upon indexing means 55 while cover 53 is retracted by cover actuator 54 from its position covering inlet ramps 27 and indentations 28 and positioned beyond the active air flow area.

FIG. 3 shows the arrangement of the transition ducting for the turbofan mode of engine operation. In such operation the transition drum 15 is turned 90° from the orientation shown in FIG. 2 since the arrangement shown is a four-passage configuration. This orientation causes air 9 leaving the front compressor 25 through stationary duct 13 to be directed into identation 28 of the transition drum 15 and to be deflected out of the engine. This produces thrust directly from the energy which has been imparted to airstream 9 by front compressor 25. This thrust, generated from a high volume of air with a small velocity component, meets the criteria for improved low-speed operating efficiency and reduced jet noise.

While the air 9 from the front compressor is being deflected out of the engine, movable duct 14 of transition drum 5 is oriented opposite inlet ramp 27 on the fixed transition section 12. This causes an independent airstream 10 to be entrained by ducting 14. This airstream 10 is fed into the rear compressor 16 and the remaining components of the engine to be processed as previously described. Inasmuch as airflow 10 is less than airflow 9 and more power is extracted from it by the turbines, its total energy and velocity at exit nozzle 26 are lower than in the turbojet mode of operation again meeting the criteria for improved low speed operation efficiency and reduced jet noise. The sum of the thrusts produced by airflows 9 and 10 in the turbofan mode of operation can be significantly higher than that produced by the single internal airflow in the turbojet mode of operation.

As described above, it can be appreciated that all engine components and the total engine energy are fully utilized during both modes of engine operation. Moreover, the variable geometry feature of the turbines of the compressors and of the exhaust nozzle permits the maximization of efficiency for each mode of operation so that, on many missions, gains in overall economy are attainable compared to that for any airplane with conventional pure turbojet or turbofan engines. Hence, an airplane powered by the dual cycle turbine engine of the present invention can be as light or lighter than a competitive airplane powered by pure turbojet or turbofan engines.

Figure 4:
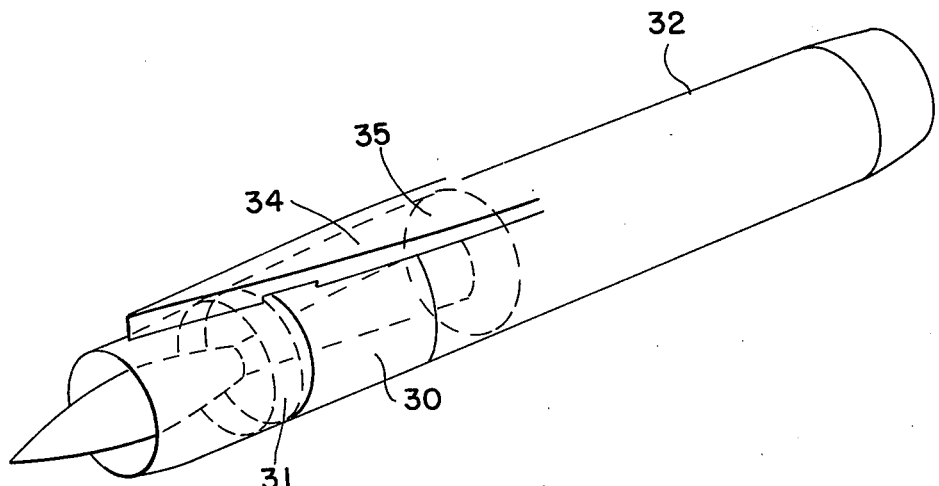
FIG. 4 is a perspective view of an engine configuration with an alternate embodiment of transition ducting showing the ducting positioned for the turbojet mode.
Figure 5:
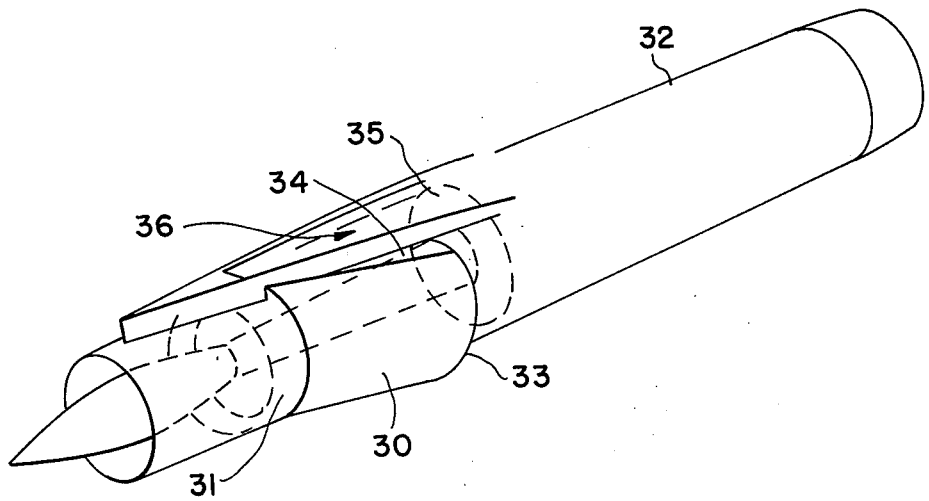
FIG. 5 is a perspective view of the embodiment of FIG. 4 with the ducting positioned for the turbofan mode.

An alternate embodiment of the invention is shown in FIGS. 4 and 5. In such a configuration the front compressor or fan 31 is also separated from the rear compressor and turbines 32. FIG. 4 shows the engine in the turbojet mode. For turbofan operation, FIG. 5, flaps 30 are extended from the nacelle sides to furnish air exits 33 for the front compressor flow. In the same action, top door 34 of the nacelle is opened to permit an independent airstream 36 to enter air scoop 35. Top door 34 and air scoop 35 have matching counterparts on the underside of the nacelle. Door 34 and its bottom counterpart act to block the exit air from front compressor 31 from mixing with the air feeding the rear compressor. In all other respects of operation the embodiment shown here is the same as the preferred embodiment described previously.

Figure 6:
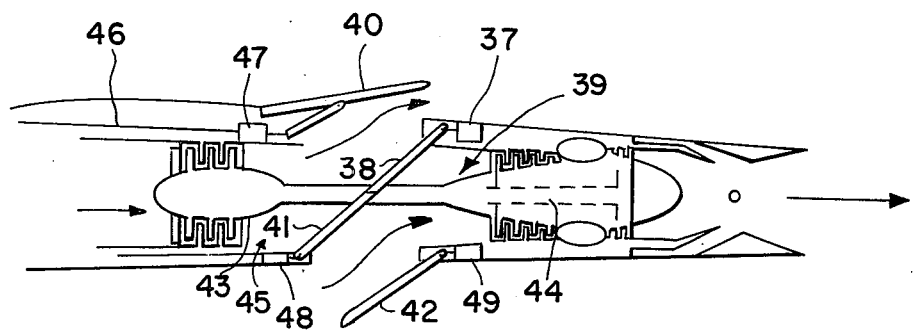
FIG. 6 is a cross section view of a third embodiment showing the ducting in position for the turbofan mode.

Another variation of the invention is shown in FIG. 6. In this embodiment the engine is mounted in a planar enclosure such as a rectangular nacelle 46 beneath an aircraft wing. This arrangement allows simple doors to accomplish the desired changes in air flow routing in the region between front compressor 43 and rear compressor 44. Flaps 38 and 41 operated by actuators 37 and 48 act to deflect the airstream leaving front compressor 43 upward through an exit caused by the opening of upper door 40 by operator 47. The lower door 42 meanwhile is opened by actuator 49 to scoop input air into rear compressor 44. The geometry of the engines and the doors in this configuration requires transition sections 45 and 39 to convert from the circular exit of the front compressor 43 to the rectangular passage with the flaps and then back again to a circular inlet to the rear compressor 44. Such transitions should have an essentially constant flow area configuration.

Figure 7:
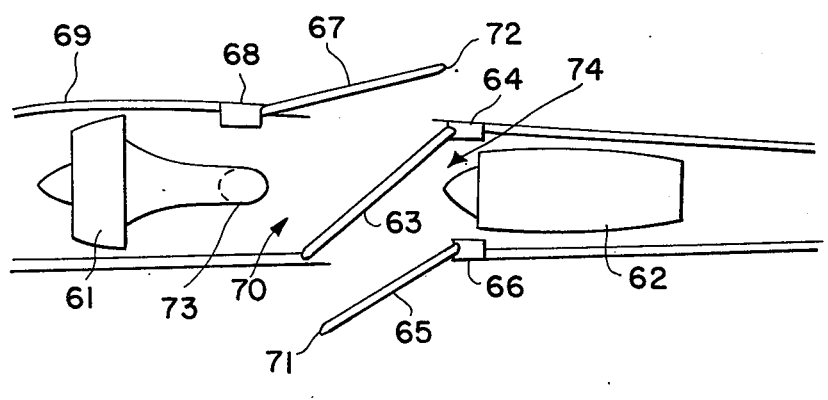
FIG. 7 is a cross section view of an embodiment utilizing completely independent engines showing the ducting in position for low speed operation.

A further variation of the invention is shown in FIG. 7. This embodiment is similar to that shown in FIG. 6 except that the engines are completely independent of each other. The leading engine 61 is a turbofan engine and the following engine 62 is a completely independent turbojet or turbofan engine. They are shown enclosed within a planar structure 69 which includes simple flap doors and an appropriately configured nacelle side exit 73 for simutaneous removal from the internal stream and optimization of the thrust of the hot exhaust flow from the leading engine. Flap 63, operated by actuator 64, diverts the turbofan fan airflow, which flows directly from engine 61 to engine 62 during high subsonic and supersonic flight, so that its exits through the opening formed when upper door 67 is operated by actuator 68 for low speed flight. Lower door 65, operated by actuator 66, is opened for low speed flight to form a scoop and draw independent input air into engine 62. As in the embodiment of FIG. 6, the independent engine configuration of FIG. 7 has transition section 70 to convert the circular leading engine air output duct to the proper configuration for the doors and a second transition section 74 to restore the duct shape to a circle ahead of the rear engine. The doors 65 and 67 have proper sealing edges 71 and 72 to maintain aerodynamically smooth surfaces when closed.

It is to be understood that the forms of the invention herein shown are merely preferred embodiments. Various changes may be made in the shape, size, and the arrangement of parts. Equivalent means may be substituted for those illustrated and described and certain features may be used independently from other features without departing from the spirit and scope of the invention as defined in the following claims. For example, the rear portion of the engine may consist of one or more complete turbojet engines fed by transition ducting alternately from a front turbofan engine or directly from an independent airstream. Likewise, the flap door described in reference to FIG. 6 may be elliptical to match circular ductwork rather than rectangular to match a planar configuration.

What is claimed as new and desired to be secured by Letters Patent of the United States is:

1. An aircraft multi-engine configuration which is comprised of:
   a first turbofan engine followed in tandem by a second turbine engine;
   duct means connecting the discharge of the first turbofan engine with the inlet of the second turbine engine;
   means whereby the hot exhaust flow from the said first turbofan engine is removed from an internal airstream ahead of the air inlet of the said second engine and diverted to an external airstream without said engine configuration in such a manner as to maximize its thrust;
   means whereby the fan-exit air from said first turbofan engine may be channeled either directly to the air inlet of said second engine or alternately away from said inlet and out of the configuration whereby independent thrust is furnished by said fan-exit air;
   means whereby air independent of said first turbofan engine hot-exhaust and fan-exit air is directed into the inlet of said second engine when said first engine fan-exit air is directed out of the configuration; and each of said aforementioned means being elements in said duct means.

2. An engine configuration as in claim 1 wherein the engines are housed in a nacelle enclosure and in which
said means whereby the fan-exit air from said first turbofan engine may be channeled out of the configuration in order to produce independent thrust thereby comprises retractable nacelle flaps extending from the sides of the engine enclosure;
said means whereby air independent of said first turbofan engine hot-exhaust and fan-exit is directed into the inlet of said second engine when said first engine fan-exit air is diverted out of the configuration comprises doors attached to said nacelle enclosure to open air intakes to the second engine upon extending the nacelle flap air exits; and
said means whereby the fan-exit air may be channeled directly to the air inlet of said second engine comprises a flow transition section between the engines and said nacelle flaps in their retracted position.

3. An engine configuration as in claim 1 wherein the engines are housed in a planar enclosure and in which
said means whereby the fan-exit air from said first turbofan may be channeled either directly to the air inlet of said second engine or alternately away from said inlet and out of the configuration comprises a deflection system including flap-type doors to alternately channel the exit air from the first engine out of the enclosure or seal the enclosure and pass the exit air of the first engine to the air input of the second engine, a deflection flap to isolate the exit air of the first engine from the input air of the second engine when said flap-type doors are open and channeling the air out of the enclosure, and a constant flow transition section between the engines to guide the exit air from the first engine to the input of the second engine when said flap-type doors are closed for high subsonic and supersonic flight; and
said means whereby air independent of said first turbofan hot-exhaust and fan-exit air is directed into the inlet of said second engine comprises flap-like doors to scoop independent air into the second engine when the air from the first engine is exiting the configuration.

4. An engine configuration as in claim 3 wherein said deflection system comprises rectangular flap-type doors and a rectangular deflector flap and further includes means to seal said flap-type doors and deflector flap against the enclosure surfaces whereby an aerodynamic surface is maintained for the enclosure and engine air passages.

5. An engine configuration as in claim 3 wherein said deflection system comprises elliptical flap-type doors and an elliptical deflection flap and further includes means to seal said flap-type doors and deflector flap against the enclosure surfaces whereby an aerodynamic surface is maintained for the enclosure and engine air passages.

6. An engine configuration as in claim 1 wherein the engines are housed in a planar enclosure and in which
said means whereby the fan-exit air from said first turbofan may be channeled either directly to the air inlet of said second engine or alternately away from said inlet and out of the configuration comprises a deflection system including flap-type doors to alternately channel the exit air from the first engine out of the enclosure or seal the enclosure and pass the exit air of the first engine to the air input of the second engine and a plurality of deflection flaps to isolate the exit air of the first engine from the input air of the second engine when said flap-type doors are open and channeling the air out of the enclosure, and a constant flow transition section between the engines to guide the exit air from the first engine to the input of the second engine when said flap-type doors are closed for high subsonic and supersonic flight; and
said means whereby air independent of said first turbofan hot-exhaust and fan-exit air is directed into the inlet of said second engine comprises flap-like doors to scoop independent air into the second engine when the air from the first engine is exiting the configuration.

* * * * *